United States Patent [19]

Lynch

[11] Patent Number: 5,140,788
[45] Date of Patent: Aug. 25, 1992

[54] BUILDING CONSTRUCTIONS

[76] Inventor: Gary M. Lynch, La Bella Vista Nursery, Brisbane Valley Highway, Fernvale QLD. 4305, Australia

[21] Appl. No.: 394,660

[22] Filed: Aug. 16, 1989

[30] Foreign Application Priority Data

Aug. 16, 1988 [AU] Australia .................. PI9880

[51] Int. Cl.⁵ .................. A01G 15/00
[52] U.S. Cl. .................. 52/63; 52/11; 52/13; 52/15; 52/171; 52/81; 47/17; 454/364
[58] Field of Search .................. 47/17; 52/63, 13–15, 52/90, 92, 83, 222, 11, 171, 81, 726, 719, DIG. 10; 248/538; 98/42.16, 42.2, 42.21

[56] References Cited

U.S. PATENT DOCUMENTS

| 490,205 | 1/1893 | Lauber | 52/63 |
| 1,022,948 | 4/1912 | Jacobs | 47/17 X |
| 1,103,773 | 7/1914 | Jacobs | 47/17 X |
| 2,230,249 | 2/1941 | Henning | 52/11 |
| 2,539,279 | 1/1951 | Shannon | 52/730 X |
| 2,982,379 | 5/1961 | Fisher | 52/726 X |
| 3,221,464 | 12/1965 | Miller | 52/DIG. 10 |
| 3,664,071 | 5/1972 | Gallagher | 52/15 |
| 3,766,573 | 10/1973 | Burkholz et al. | 52/63 X |
| 3,911,632 | 10/1975 | Bryfogle | 52/63 X |
| 3,961,442 | 6/1976 | Carter | 47/17 |
| 4,117,636 | 10/1978 | Smith | 52/63 X |
| 4,305,235 | 12/1981 | Roston | 52/171 X |
| 4,455,006 | 1/1984 | Aaserude | 248/538 X |
| 4,542,759 | 9/1985 | Kyner, Jr. | 52/81 X |
| 4,672,889 | 6/1987 | Lynch | 98/42.2 |
| 4,837,990 | 6/1989 | Peleg | 47/17 X |
| 4,915,022 | 4/1990 | Lynch | 98/42.2 |

FOREIGN PATENT DOCUMENTS

| 3113932 | 10/1982 | Fed. Rep. of Germany | 52/171 |
| 3243525 | 5/1984 | Fed. Rep. of Germany | 52/13 |
| 948730 | 3/1949 | France | 52/13 |
| 2594631 | 8/1987 | France | 52/171 |
| 8103296 | 5/1981 | Netherlands | 47/17 |
| 8804345 | 6/1988 | World Int. Prop. O. | 52/719 |

OTHER PUBLICATIONS

Portway's Specification No. 2426 1873.

Primary Examiner—David A. Scherbel
Assistant Examiner—Wynn E. Wood
Attorney, Agent, or Firm—Hoffman, Wasson & Gitler

[57] ABSTRACT

A building structure for plant nursery or like buildings including a pair of side frame assemblies, each defined by an elongated gutter member supported at an elevated attitude by a plurality of upstanding supports. Brackets are disposed between the supports and the gutter member, the brackets including opposite side flanges disposed adjacent opposite sides of the gutter member to stiffen same. Straps span the gutter and connect the sides thereof together to resist splaying and thus deflection of the gutter under wind loading. The building structure includes a roof frame formed of a plurality of arcuate roof frame members which are supported in opposite sockets secured to the side flanges of the brackets.

10 Claims, 3 Drawing Sheets

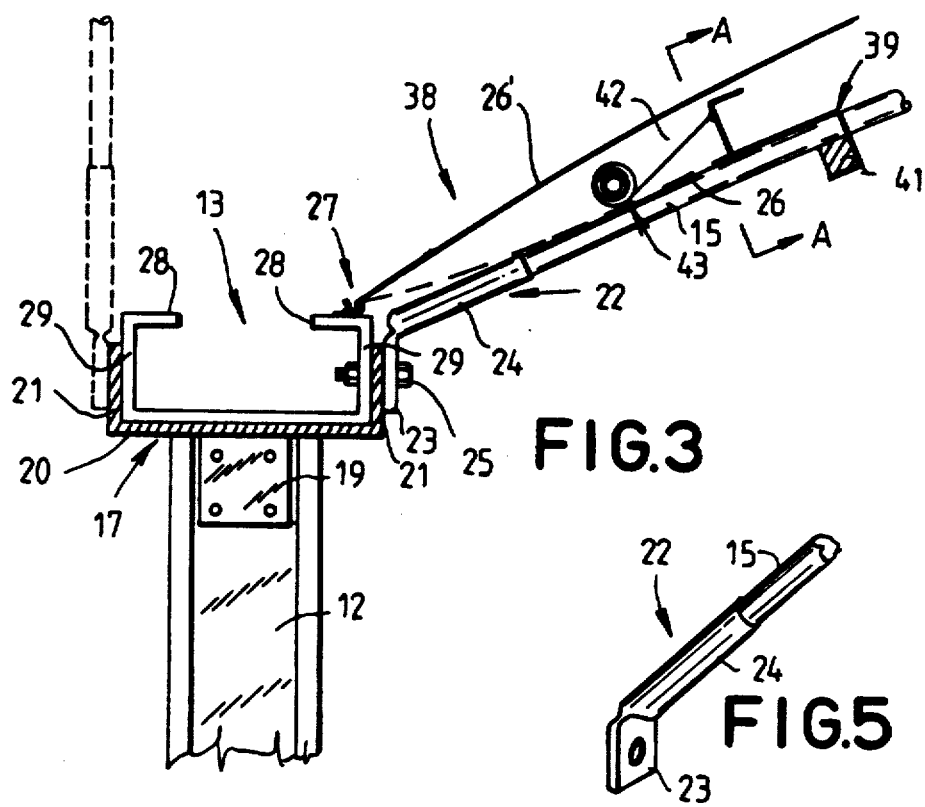
FIG.3
FIG.5
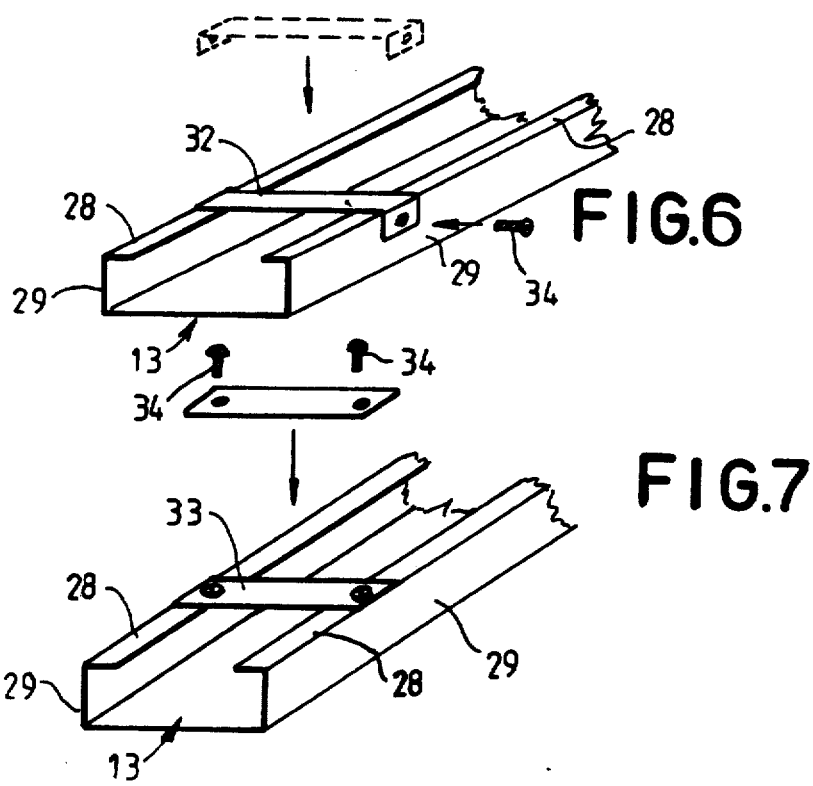
FIG.6
FIG.7

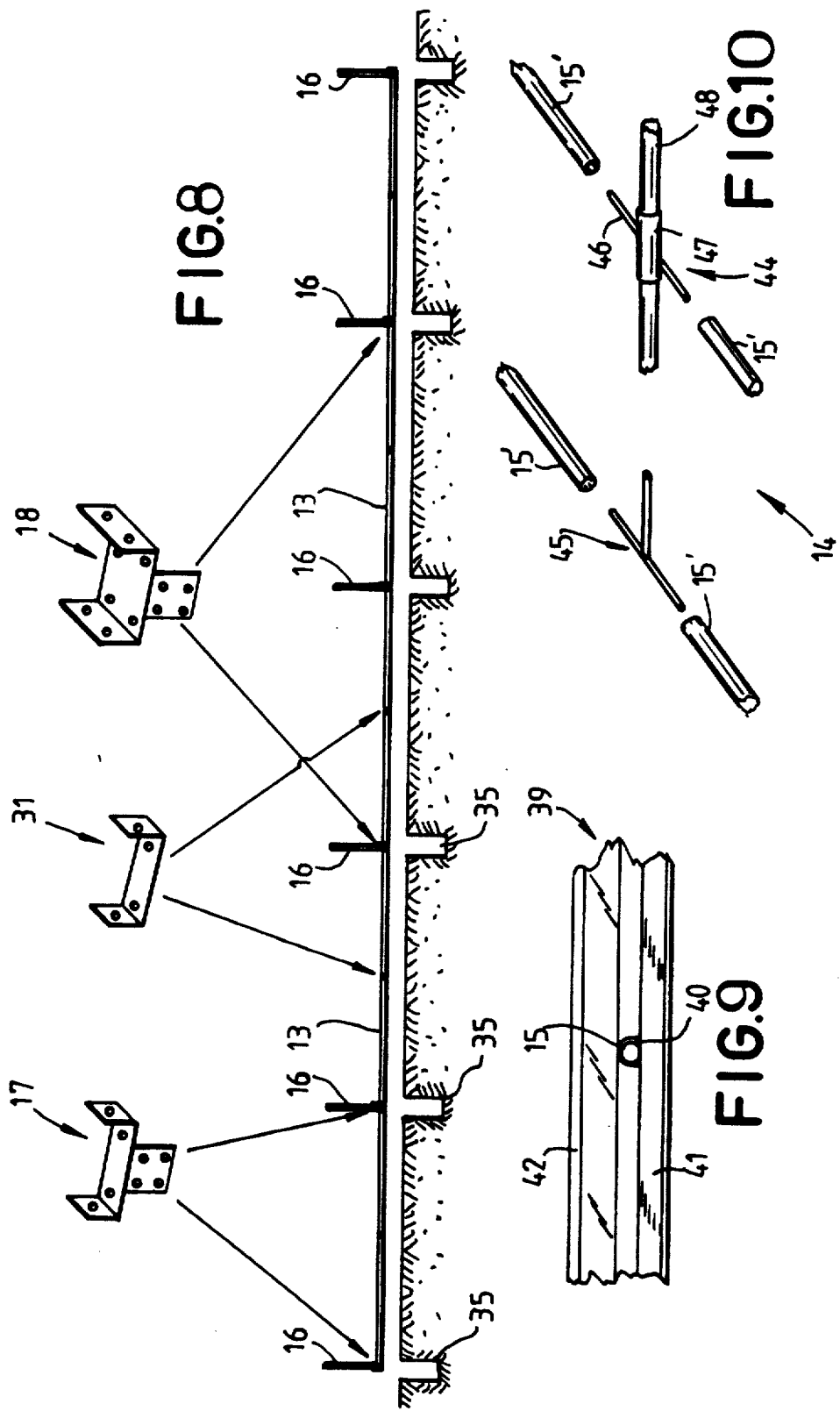

BUILDING CONSTRUCTIONS

FIELD OF THE INVENTION

This invention relates to improvements to building constructions, and in particular to a building construction for agricultural purposes, such as a plant nursery building or greenhouse.

DESCRIPTION OF THE RELATED ART

Many different forms of building constructions are available for plant nursery or other applications. In one known form of building, a plurality of upright channel sectioned side members are provided and carry at their upper ends longitudinally extending gutter sections to which a roof frame assembly is supported by a plurality of brackets. Whilst this arrangement provides an inexpensive, easy to erect, building, some ponding of rain water occurs at the junction of the roof fabric and the side gutter sections. Furthermore, there is a limit to the length at the side gutter sections may extend due to upward wind loading on the roof fabric material.

Various different roof systems have been proposed for buildings of the above type and for other plant nursery buildings, and, generally, it is important in such buildings that an efficient means is provided to enable venting of hot air. Such proposals in the past have involved the provision of vent systems at the roof apex and whilst such systems are suitable in many circumstances, they do increase the overall cost of buildings.

BRIEF SUMMARY OF THE INVENTION

The present invention aims to overcome or alleviate one or more of the above disadvantages, or at least to provide an alternative to the presently known building constructions, by providing an improved side wall structure for such buildings. The present invention also aims to provide improved vent systems for such buildings.

The present invention thus provides in a first preferred aspect a building structure comprising a first row of upstanding side members, a second row of upstanding side members extending substantially parallel to said first row, said first and second rows supporting at an elevated attitude respective elongated members of channel section form defining gutters for said building structure, and supporting bracket means between said elongated members and said side members, each said bracket means including a pair of opposite side flange portions disposed adjacent opposite sides of said elongated gutter members whereby to support same Preferably, the supporting bracket means also includes a flange portion secured to a side upstanding member and a further flange portion disposed substantially at right angles thereto and defining a seat for a said elongated member. Suitably, the pair of opposite side flange portions of the bracket means are disposed substantially at right angles to the further flange portion.

Preferably each opposite side flange portion is arrange to be connected to further bracket means to support the roof frame for the building. Preferably the roof frame is in the form of a plurality of arcuate members which extend between opposite sides of the building and the further bracket means are in the form of short tubular members which are flattened at one end to facilitate connection to the third or fourth flange portions and which are adapted at their opposite end to receive or engage an arcuate roof frame member.

Suitably the further flange portions are apertured, as is the flattened end of the tubular members, so that connections may be made therebetween by simple bolting. Normally the flattened portion is disposed at an obtuse angle relative to the remainder of the pipe member; however, where a vent in a roof structure is to be formed, the flattened section extends parallel to the remainder of the pipe member so that a vent of sawtooth configuration may be formed.

To further stiffen the elongated channel members, straps may be located at intermediate positions between the supporting bracket means and secured to the upper flanges of the channel member by any suitable fasteners. Alternatively the straps may be of channel sectioned form to span the gutter sections and be secured to the side walls thereof.

The present invention also provides, in a second preferred aspect, an improved venting system for a building of the type having a plurality of roof frame members extending from a generally horizontal side member, said vent system comprising a further member secured to said roof frame members at a position spaced from said side member and extending parallel thereto, the area between said further member and side member defining a vent opening into said building and there being provided means for closing said vent opening. Preferably the latter means are in the form of a roller blind, or screen, secured at one end to the further member and being adapted to be unrolled to close the vent opening, or rolled up to open the vent opening.

BRIEF DESCRIPTION OF THE DRAWINGS

In order that the invention may be more readily understood and put into practical effect reference will now be made to the accompanying drawings which illustrate a preferred embodiment of the invention and wherein:

FIG. 3 is a sectional view showing details of the connection between the roof frame members and side gutter sections and an associated vent assembly;

FIG. 5 illustrates the preferred bracket for supporting the roof frame members;

FIG. 6 and 7 illustrate the manner in which the side gutter members may be stiffened;

FIG. 8 illustrates the manner of forming the building foundation;

FIG. 9 is a view in the direction of A—A of FIG. 3 showing details of the vent framing; and FIG. 10 illustrates details of the roof frame assembly of the building.

DETAILED DESCRIPTION OF THE DRAWINGS

Figure 1:
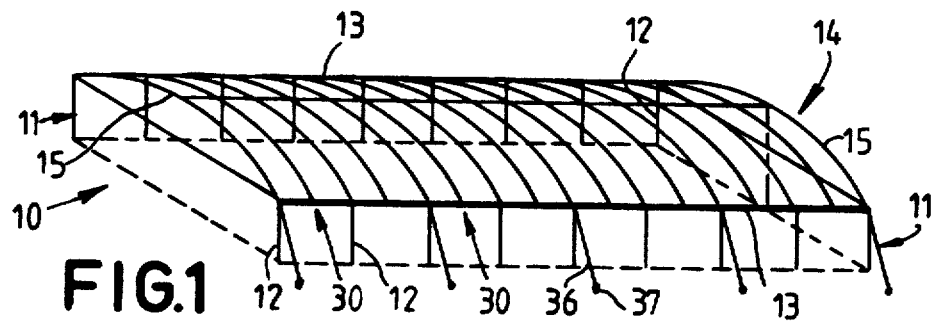
FIGS. 1 and 2 illustrate in schematic perspective and end views the frame of a building constructed in accordance with the present invention.

Referring to the drawings and firstly to FIG. 1 there is illustrated a building 10 constructed in accordance with the invention and including a pair of side frame assemblies 11 defined by first and second rows of a plurality of upstanding frame members 12 which support at their upper end a pair of elongated side gutter members 13 of channel sectioned form. A roof frame assembly 14 comprised of a plurality of arcuate members 15 extends between the side gutter members 13, to be supported thereby, or by the upstanding members 12.

Figure 4:
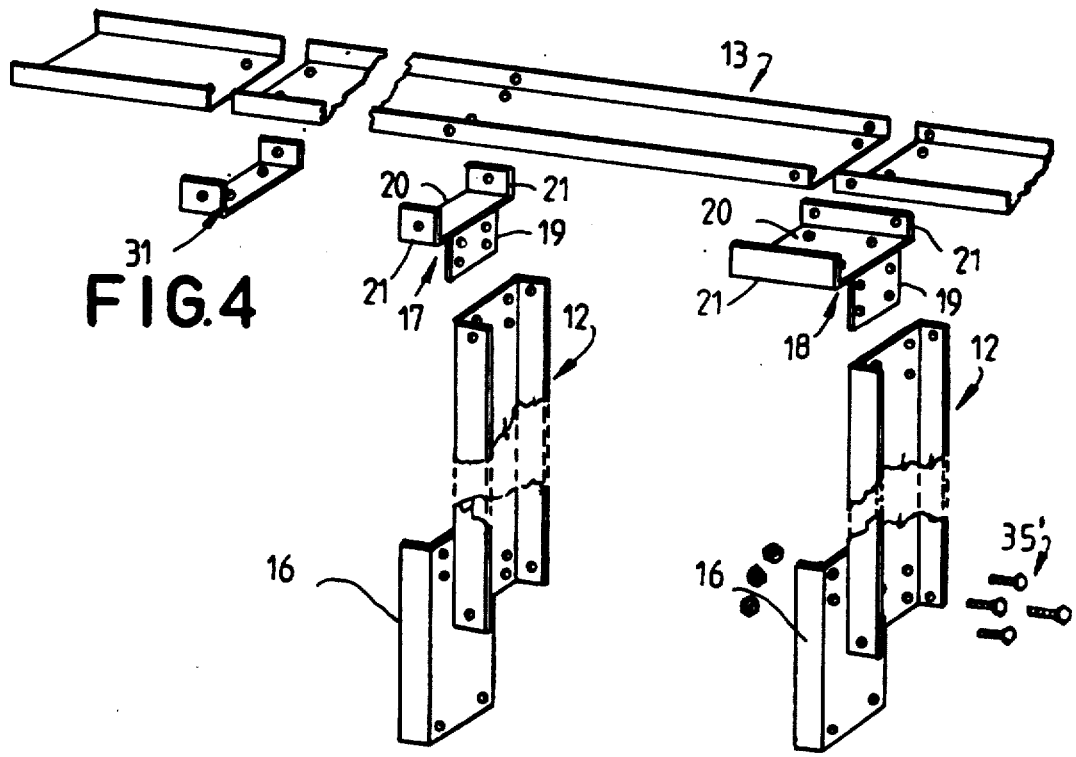
FIG. 4 illustrates in exploded view portion of a side wall construction of a building according to the invention.

As shown more clearly in FIGS. 3 and 4, the frame members 12 are of channel sectioned form and are supported and secured as by bolting at their lower end in back to back relationship to further foundation channel members 16 whilst at their upper ends the members 12 carry brackets 17 or 18 which define seats for the elongated gutter members 13. Each bracket 17 or 18, as shown, includes a first flange portion 19 which extends into the channel of the members 13 and is secured thereto by means of bolts passed through aligned apertures in the flange portion 19 and side members 12. The brackets 17 and 18 also include further flange portions 20 extending substantially at right angles to the flange portion 19 with this portion being apertured so as to facilitate connection by bolting to the gutters 13.

The further flange portions 20 are provided with a pair of upstanding side flange portions 21 which are spaced apart slightly more than the distance between the side walls of the gutter members 13 so that the gutter members 13 locate neatly therebetween and so the flange portions 21 provide a support for the gutter sections 13 during high wind loading on the roof. It will be seen that the bracket 18 includes enlarged flange portions 20 and 21 so as to define a mount for a pair of abutting gutter members 13 (see FIG. 4).

For supporting the roof frame members 15 a plurality of further brackets 22 are provided, each bracket 22 being in the form of a short section of pipe flattened and apertured at one end 23 and defining a socket at its other end 24 for neat receipt of the end of an arcuate roof member 15 (see FIG. 5). The flattened end 23 is disposed at an obtuse angle to the opposite end 24; however, this angle may be varied by simple bending of the end 23 relative to the end 24 to compensate for variations in the ground surface upon which the building is erected.

As shown in FIG. 3 the flattened end 23 of the bracket 22 is secured to a side flange portion 21 of the bracket 17 or 18 by means of a bolt or other fastening 25 passed through the aligned apertures in the flattened portion 23 and flange portion 21 and also through a side wall 29 of the gutter member 13.

The roof covering 26 of the building 10 preferably is in the form of a fabric which may be a woven fabric, for example, a shade cloth or an impervious material, such as a plastic film covering 26, is disposed above the roof frame member 15 and secured by means of an extruded elongated fastening system 27 either to the top flange 28 of the gutter 13 or the side wall 29 thereof. It will be apparent in FIG. 3 that the roof covering 26 (shown in dotted outline where a vent is not used) is substantially supported in the region adjacent its connection to the gutter 13 so that moisture deposited thereon from rain or other source will pass without ponding into the gutter 13.

At positions 30 intermediate the upstanding members 12 brackets 31 of channel sectioned form may be employed being secured to the underside of the gutters 13 and having the roof frame members 15 connected thereto via the brackets 22 in a similar manner to that shown in FIG. 3.

To stiffen the gutters 13 intermediate the upstanding side members 12 straps 32 and 33 of the type shown in FIGS. 6 and 7 are employed to span the gutter 13 and connect the sides thereof together. The straps 32 of FIG. 6 are of channel form and extend over the side walls 29 of the gutter 13 and are apertured so as to receive a screw 34 of the type sold under the trademark TEK or any other suitable fastener. In the alternative configuration of FIG. 7, the straps 33 may be of simple planar form to span the gutter 13 and be secured to the top flanges 28 thereof again by means of TEK screws 34 or other fasteners. Either of the above arrangements will convert the gutter 13 in the region of the straps 33 and 34 into a box section to resist outward playing of the side walls 29 and thus deflection of the gutters 13 due to wind loadings.

In erecting the side frame assemblies 11 of the building according to the invention and as shown in FIG. 8 a plurality of foundation holes 35 are formed at spaced apart positions where the wall is to be erected and supported and the elongated gutter members 13 are then laid out along the line of the foundation holes 35 and interconnected where required by the brackets 18, the position of which corresponds to location of some of the foundation holes 35. Brackets 17 may then be secured to the interconnected gutter member 13 in alignment with further foundation holes 35 and further channel brackets 31 may be secured to the gutters 13 at positions intermediate the brackets 17 or 18. Respective foundation channel members 16 may then be secured to the respective brackets 17 or 18 so as to be upstanding therefrom. The whole assembly may then be overturned so that the foundation members 16 locate in the foundation holes 35 and the holes 35 may then be filled with concrete with the gutters 13 and brackets 17 and 18 acting as locating jigs whilst the concrete is being applied and whilst the concrete is curing. If required conventional means may be employed to ensure levelling of the foundation members 16. After curing the channel members 16 may be detached from the gutters 13 and the walls may be erected.

For wall erection respective frame members 12 are located in back to back relationship to the channel members 16 and are secured at one end by the brackets 17 and 18 to the assembled gutter members 13 and at their opposite end by a single bold 35 to the respective foundation members 16, this bolt serving as a pivot bolt. The assembly of gutters 13 and frame members 13 may then be erected by pivoting same about the pivot bolts 35 with the air of bracing cables if desired until the members 12 adopt an upright attitude so that they may be secured to the channel member 16 by bolting as described above. The side frame assemblies 11 of the building may be further braced against longitudinal movement as desired.

Figure 2:
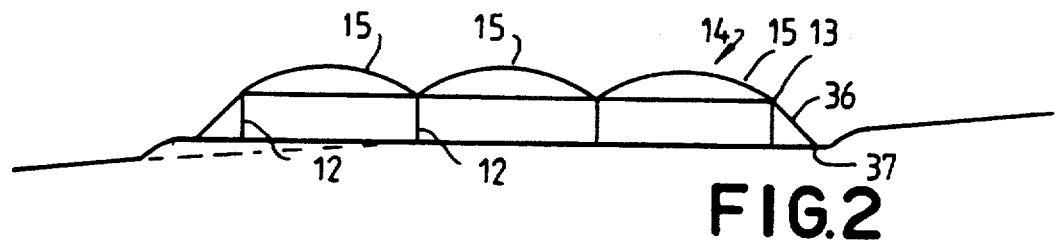

As shown in FIGS. 1 and 2, the side support members 12 may be braced by cables 36 anchored at 37 in the ground and having sleeves placed therearound so as to define a support for shade cloth or other material at the side of the building. At the end walls, the bracing is preferably by means of channel sectioned members, which extend at an inclined angle to be anchored in the ground.

The wall frame assembly described above may define a support for any suitable roof structure and any venting arrangement may be incorporated into such a structure. Furthermore, the frame assembly may be applied to a building having nay number of bays. One such suitable venting arrangement is shown in FIGS. 3 and 9. This venting assembly 38 is shown applied to a gutter roof frame structure of the type shown in FIG. 3, however, it may readily be applied to other building configurations. As shown, a Z-sectioned member 39 extends longitudinally of the building, parallel to the gutters 13 but spaced therefrom. One side of the Z-sectioned member 39 is cut-out at 40 so as to locate about respective arcuate roof frame members 15. Preferably a beading member 41 extends along the Z-sectioned member 39 to brace same in the region of the cut-outs 40, the beading member 41 being secured to the Z-sectioned member 39 in any suitable manner. Fabric 42 of a roller blind 43 is secured to the Z-section member 39 by any suitable fastener means and it will be apparent that the roller blind 43 may be rolled up or down to open or close the region between the member 39 and gutter 13. In this arrangement, of course the roof fabric suitably comprises a pervious material 26', such as shade cloth so that hot air vented from the building may escape therethrough.

The roof frame assembly 14 of the building 10 as shown in FIG. 10 preferably has the arcuate members 15 in two parts joined at the center by means of the connectors 44 intermediate the ends of the building and the connectors 45 at the ends of the building. As shown, the connectors 44 include a first portion 46 which projects into the ends of respective members 15 and a second hollow tubular portion 47 normal to the portion 46 which receives a longitudinally extending central member 48 of the roof assembly 14.

At the ends of the building, the connectors 45 are of T-sectioned form to project into the opposite arcuate members 15' and 15" and member 48.

The above frame system is designed to follow the contour of the land upon which the building is erected so as to minimize excavation costs, this being accommodated by the use of the brackets 22 which may be bent to the required angle in accordance with the contour. All the side members 12 in this situation are supported vertically and the gutters follow the fall of the land. It is preferred that the building be reasonably level across its width with a fall down the length of the building for good drainage purposes. The building described above may have many configurations as desired to a suitable purpose such as for greenhouses or shade houses.

What I claim is:

1. A building structure comprising a first row of upstanding side members;
   a second row of upstanding side members extending substantially parallel to said first row;
   said first and second rows supporting at an elevated attitude respective elongated members of channel section form;
   said elongated members including a pair of opposite upstanding side walls and a pair of opposite top flanges extending inwardly from the respective said side walls, said elongated members defining gutters for said building structure;
   supporting bracket means supporting said elongated members on each of said side members;
   each said supporting bracket means including a first flange portion secured to a said upstanding member, a second flange portion disposed substantially at right angles to said first flange portion and a pair of opposite side flange portions extending substantially at right angles to said second flange portion and being disposed adjacent opposite side walls of said elongated members whereby to support same;
   roof bracket means arranged at positions along the respective said elongate members and adjacent respective said supporting bracket means;
   fastener means extending through said roof bracket means, a side flange portion of said supporting bracket means and a side wall of said elongated members for securing said roof bracket means to said elongated members;
   said roof bracket means supporting respective arcuate roof frame members;
   further said roof bracket means secured to said elongated members at positions intermediate said upstanding side members and supporting further said arcuate roof frame members;
   a flexible roof membrane supported on said roof frame members;
   each said elongated member bring provided with stiffening means extending between opposite side walls of said elongated members and secured thereto, said stiffening means being disposed along said elongated members at positions intermediate said upstanding side members and resisting outward movement of said side walls away from each other.

2. A building structure according to claim 1 wherein said roof bracket means are in the form of tubular members which are flattened at one end, said fastener means passing through said flattened ends of said tubular members and wherein said tubular members define sockets at their opposite ends for receiving the ends of respective said arcuate roof frame members.

3. A building structure according to claim 2 wherein said side flange portions of said supporting brackets and said side walls of said elongated members are apertured whereby to receive said fastener means therethrough.

4. A building structure according to claim 1 wherein said stiffening means are of channel sectioned form and are secured to the opposite side walls of said elongated member.

5. A building structure according to claim 1 wherein said upstanding side members are of channel sectioned form.

6. A building structure according to claim 5 wherein respective said upstanding side members are secured in back-to-back relationship to a respective channel sectioned foundation member supported in the ground.

7. A building structure according to claim 1 and including elongated fastening means mounted on said top flanges of said elongated members and securing said roof members thereto.

8. A building structure according to claim 1 and including a vent assembly, said vent assembly comprising a further member secured to said roof frame members at a position spaced from and adjacent said side elongated member and extending parallel thereto, the area between said further member and side member defining a vent opening into said building and there being provided means for selectively closing said vent opening.

9. A building structure according to claim 8 wherein said vent closing means comprises a roller blind or screen secured at one end to said further member and being adapted to be unrolled to close said vent opening or rolled up to open said vent opening.

10. A building structure comprising a first row of upstanding side members;
    a second row of upstanding side members extending substantially parallel to said first row;
    said first and second rows supporting at an elevated attitude respective elongated members of channel section form;

said elongated members including a pair of opposite upstanding side walls and a pair of opposite top wall extending inwardly from the respective said side walls, said elongated members defining gutters for said building structure;

supporting bracket means supporting said elongated members on each said side members;

each said supporting bracket means including a first flange portion secured to a side upstanding member, a second flange portion disposed substantially at right angles to said first flange portion and a pair of opposite side flange portions extending substantially at right angles to said second flange portion and being disposed adjacent opposite side walls of said elongated members whereby to support same;

roof bracket means arranged at positions along the respective said elongated members and adjacent respective said supporting bracket means;

fastener means extending through said roof bracket means, a side flange portion of said supporting bracket means and a side wall of said elongated members for securing said roof bracket means to said elongated members;

said roof bracket means supporting respective roof frame members;

a flexible roof membrane supported on said roof frame members;

each said elongated member being provided with stiffening means extending between opposite walls of said elongate member and secured thereto, said stiffening means being disposed along said elongated members at positions intermediate said upstanding side members and resisting outward movement of said side walls away from each other.

* * * * *